US008255141B2

(12) United States Patent
Lemke et al.

(10) Patent No.: US 8,255,141 B2
(45) Date of Patent: Aug. 28, 2012

(54) METHOD AND VEHICLE ELECTRIC SYSTEM FOR A MOTOR VEHICLE WITH A PRE-EMPTIVE TEMPORARY TORQUE RESTRICTION OF THE INTERNAL COMBUSTION ENGINE

(75) Inventors: Olaf Lemke, Munich (DE); Martin Hauschild, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 597 days.

(21) Appl. No.: 12/474,773

(22) Filed: May 29, 2009

(65) Prior Publication Data

US 2009/0292450 A1 Nov. 26, 2009

Related U.S. Application Data

(63) Continuation of application No. PCT/EP2006/011484, filed on Nov. 30, 2006.

(51) Int. Cl.
*B60T 7/12* (2006.01)

(52) U.S. Cl. .................. 701/103; 701/104; 123/406.11; 123/406.47

(58) Field of Classification Search .................. 701/101, 701/103–105, 110, 114, 115; 123/406.11, 123/406.47, 434
See application file for complete search history.

(56) References Cited

U.S. PATENT DOCUMENTS

| | | | | |
|---|---|---|---|---|
| 5,483,446 | A | 1/1996 | Momose et al. | |
| 7,974,763 | B2 * | 7/2011 | Hauschild et al. | 701/102 |
| 8,011,902 | B2 * | 9/2011 | Nagase et al. | 417/410.1 |
| 2008/0109125 | A1 * | 5/2008 | Hahn | 701/22 |
| 2008/0242464 | A1 * | 10/2008 | Kumazaki et al. | 475/136 |
| 2009/0151491 | A1 * | 6/2009 | Tabata et al. | 74/335 |
| 2009/0156359 | A1 * | 6/2009 | Tabata et al. | 477/108 |

FOREIGN PATENT DOCUMENTS

| | | | |
|---|---|---|---|
| DE | 101 56 665 | A1 | 9/2002 |
| DE | 102 16 184 | A1 | 2/2003 |
| DE | 102 52 292 | A1 | 6/2004 |
| DE | 10 2004 003 019 | A1 | 8/2004 |

OTHER PUBLICATIONS

International Search Report dated Aug. 29, 2007 with English translation (six (6) pages).

* cited by examiner

*Primary Examiner* — John Kwon
(74) *Attorney, Agent, or Firm* — Crowell & Moring LLP

(57) ABSTRACT

A method for reducing energy consumption of a motor vehicle having an internal combustion engine and a vehicle electric system, to which at least a first electric consumer is connected. To achieve an efficient vehicle electric system with a reduced energy consumption, the internal combustion engine is operated in a first operating mode with a first injection quantity and a first ignition timing. In a second operating mode, the internal combustion engine is operated with a second injection quantity that is higher than the first injection quantity and with a second ignition timing. A driving situation detection device recognizes an imminent specific driving situation on the basis of the previous behavior of the driver in controlling the vehicle and/or the behavior of the vehicle in advance and initiates a switch in the operating modes of the internal combustion engine from the first operating mode to the second operating mode.

16 Claims, 6 Drawing Sheets

METHOD AND VEHICLE ELECTRIC SYSTEM FOR A MOTOR VEHICLE WITH A PRE-EMPTIVE TEMPORARY TORQUE RESTRICTION OF THE INTERNAL COMBUSTION ENGINE

CROSS-REFERENCE TO RELATED APPLICATIONS

This application is a continuation of PCT International Application No. PCT/EP2006/011484, filed Nov. 30, 2006, the entire disclosure of which is herein expressly incorporated by reference.

This application contains subject matter related to the subject matter of application Ser. Nos. 12/474,761 and 12/474,754, entitled "Method and Vehicle Electric System for a Motor Vehicle With a Pre-Emptive Temporary Load Reduction of the Vehicle Electric System," and "Method and Vehicle Electric System of a Motor Vehicle With a Pre-Emptive Temporary Increase in the Idling Speed of the Internal Combustion Engine," respectively, filed on even date herewith.

BACKGROUND AND SUMMARY OF THE INVENTION

The invention relates, in particular, to a method for reducing the energy consumption of a motor vehicle having an internal combustion engine and at least one vehicle electric system, to which at least a first electric consumer or load is connected.

The number of electric consumers in motor vehicles has increased dramatically. In order to reduce the emission of CO2 in the vehicle, hydraulically operating consumers are being replaced by electric consumers. Thus, for example, one option is to replace the hydraulic steering of the motor vehicle with an electric power steering (EPS). However, such electric consumers can, in a short period of time, overtax the vehicle electric system with their high power demand. The result is that there is also a high demand that the electric system of the motor vehicle be stable. In particular, when high loads occur for a short period of time, adequately high electric voltage or rather electric power must be available.

There is therefore needed, in particular, a method that makes it possible to achieve an efficient vehicle electric system with a reduced energy consumption of a motor vehicle.

This and other needs are met by a method and/or vehicle electric system for reducing the energy consumption of a motor vehicle having an internal combustion engine and at least one vehicle electric system, to which at least a first electric consumer is connected. The internal combustion engine is operated in a first operating mode with a first injection quantity and a first ignition timing. In a second operating mode, the internal combustion engine is operated with a second injection quantity that is higher than the first injection quantity and with a second ignition timing, the second ignition timing at the second injection quantity not being as favorable to the performance of the internal combustion engine as the first ignition timing. In a third operating mode, the internal combustion engine is operated with the second injection quantity and predominantly the first ignition timing so that the performance of the internal combustion engine is higher in the third operating mode than in the second operating mode. A device, which is intended for detecting the driving situation and is provided in the vehicle, recognizes an imminent specific driving situation on the basis of the previous behavior of the driver in controlling the vehicle and/or the behavior of the vehicle in advance and initiates a switch in the operating modes of the internal combustion engine from the first operating mode to the second operating mode. Advantageous embodiments of the invention are further described herein.

One aspect of the invention consists of the fact that the internal combustion engine is operated in a first operating mode with a first injection quantity and a first ignition timing. For example, both the electric generator of the vehicle and the battery of the vehicle feed jointly the vehicle electric system in order to supply the electric consumers with adequate electric voltage. In the first operating mode the generator can be loaded to full capacity.

In a second operating mode, the internal combustion engine is operated with a second injection quantity that is higher than the first injection quantity and with a second ignition timing. The second ignition timing at the second injection quantity is not as favorable to the performance of the internal combustion engine as the first ignition timing. The second injection quantity that is higher than the first injection quantity increases on its own the performance of the internal combustion engine and enables the internal combustion engine to deliver a higher torque to the electric generator of the motor vehicle. Without any counter-measure, the speed of the internal combustion engine increases—surprisingly to the driver—so that the driver would get the impression that there is a defect. In order to compensate for this rise in torque, the invention provides that in the second operating mode the ignition timing is shifted from the first ignition timing to a second ignition timing. As a result, the performance of the internal combustion engine, or rather its torque, is reduced preferably in essence to the same extent as its torque has been increased by the increase in the injection quantity. The result of the second operating mode is a torque restriction of the internal combustion engine, and the speed of the engine during the transition from the first operating mode to the second operating mode remains largely constant.

In a third operating mode, the internal combustion engine is operated with the second injection quantity and predominantly the first ignition timing so that the performance or rather the torque of the internal combustion engine is higher in the third operating mode than in the second operating mode.

A device, which is intended for detecting the driving situation and is provided in the vehicle, recognizes an imminent specific driving situation on the basis of the previous behavior of the driver in controlling the vehicle and/or the behavior of the vehicle in advance, and initiates a switch in the operating modes of the internal combustion engine from the first operating mode to the second operating mode. Therefore, the invention provides that the recognition of an imminent specific driving situation causes a torque restriction of the internal combustion engine through an increase in the injection quantity. This torque restriction serves to stabilize the voltage of the vehicle electric system when this voltage is actually required on short notice.

In the known vehicle electric systems of the prior art, turning on an electric consumer that puts a higher load on the vehicle electric system causes a delay in the loading of the electric generator. This delay occurs in that the consumer is fed initially from the vehicle battery and then increasingly by the generator. Typically this procedure, the so-called load-response, lasts a few seconds. Owing to this delay greater fluctuations in the speed of the internal combustion engine upon powering up the consumers with a high current requirement are avoided.

A preferred embodiment of the invention provides that especially in the third operating mode of the internal combustion engine a higher electric load on the vehicle electric system is also largely passed on without delay to the electric generator of the vehicle.

Therefore, this preferred embodiment does not carry out a so-called load-response procedure, in particular, in the third operating mode.

A preferred embodiment of the invention provides that upon recognizing the specific driving situation, the device for detecting the driving situation initiates a switch in the operating modes of the internal combustion engine from the second operating mode to the third operating mode. On account of the inventive torque restriction in the second operating mode, the torque, which is restricted by the internal combustion engine, can be provided on very short notice owing to the displacement of the ignition timing during the transition to the third operating mode. This displacement can be implemented very quickly by way of hardware. The internal combustion engine does not stall and it can deliver the necessary torque to the electric generator. The electric generator can feed a higher electric power into the vehicle electric system and the electric voltage is stabilized, or rather does not collapse, despite a suddenly occurring higher load in the vehicle electric system.

One embodiment of the invention provides that the device for detecting the driving situation recognizes the (actual) occurrence of the specific driving situation by the fact that the electric voltage of the vehicle electric system is on the verge of collapsing. The goal is to monitor the voltage and, if desired, to adjust the ignition angle so as to increase the torque in a relatively simple way with hardware and at a low cost.

One possible embodiment of the invention provides that upon recognizing the imminent specific driving situation, the device for detecting the driving situation initiates, instead of a switch in the operating modes of the internal combustion engine from the first to the second operating mode, a switch in the operating modes of the internal combustion engine directly from the first to the third operating mode.

In this case, it does not concern a preferred, but rather a possible embodiment of the invention.

One embodiment of the invention provides that the device for detecting the driving situation takes into consideration who the current driver is and what his previous behavior has been. In this way the hit rate for predicting that a cornering action is imminent can be raised. If, for example, the device for detecting the driving situation recognizes that the driver in question always swerves during a cornering action (a maneuver that is not always done by every driver), this criterion can be weighted higher in the algorithm for recognizing a cornering action.

One embodiment of the invention provides that the first electric consumer is an electrically operated steering system of the motor vehicle and the imminent specific driving situation is a cornering action. Especially during a cornering action it is important for the driver that the behavior of the steering system not be adversely changed or that the steering not become stiff. During a cornering action the power requirement of an electric steering system is especially high.

One embodiment of the invention provides that the position of the accelerator pedal or rather gas pedal is detected by the device for detecting the driving situation, and the operating mode of the internal combustion engine is switched from the first operating mode to the second operating mode, when the accelerator pedal or rather the gas pedal is located largely in its rest position, and at least one additional driving situation occurs. Even this feature is a characteristic of an imminent cornering action and yields an important indicator of an imminent cornering action.

A further development of the invention provides that the acceleration and the speed of the vehicle are detected by the device for detecting the driving situation, and the operating mode of the internal combustion engine is switched from the first operating mode to the second operating mode, when the acceleration of the vehicle is negative, the speed falls below a predetermined threshold value, and at least one additional driving situation occurs. This feature, too, is characteristic of an imminent cornering action and furnishes an important indicator of an imminent cornering action.

A preferred embodiment of the invention provides that the device for detecting the driving situation checks whether the vehicle is making a swerving maneuver. Driving in swerving mode can give a very clear sign of an imminent cornering action.

In one embodiment of the invention the steering angle of the electric steering system of the vehicle is detected by the device for detecting the driving situation. The operating mode of the internal combustion engine is switched from the first operating mode to the second operating mode, when the absolute value of the steering angle is greater than the predetermined threshold value and at least one additional driving situation occurs. This feature may be an indicator that the driver is beginning to make a swerving maneuver or rather a cornering maneuver.

An additional embodiment of the invention provides that the steering angle of the electric steering system of the vehicle is detected by the device for detecting the driving situation, and the operating mode of the internal combustion engine is switched from the first operating mode to the second operating mode, when the absolute value of the steering angle is greater than a predetermined speed-dependent steering threshold or rather steering angle threshold, and at least one additional driving situation occurs. If the driver does not swerve prior to a cornering action, this characteristic of an imminent cornering action may replace the "swerving criterion" and may raise the reliability of the prediction of an imminent cornering action.

A further development of the invention provides that the device for detecting the driving situation checks whether the brake pressure is higher than a predetermined brake pressure or rather a tolerance pressure and, in addition, checks whether the speed is less than a predetermined acceleration-dependent speed value and/or a dynamic cornering threshold. In this way the reliability of the prediction of a cornering action can be increased even more.

In addition, the invention proposes a vehicle electric system of a motor vehicle that exhibits a program-controlled device, which is intended for detecting the driving situation and carries out the method of the invention. Furthermore, the invention proposes a program-controlled device, which is intended for detecting the driving situation and which carries out the method of the invention or initiates its execution.

The inventive method is described in detail below with reference to the flow charts using a cornering action as an example. Identical reference numerals and symbols show the same functions or functions that have the same effect.

Other objects, advantages and novel features of the present invention will become apparent from the following detailed description of one or more preferred embodiments when considered in conjunction with the accompanying drawings.

DETAILED DESCRIPTION OF THE DRAWINGS

The starting point for the following embodiment of the inventive method is the following. The motor vehicle is equipped with an electric steering system. The electric steering system requires an adequately high electric voltage for executing a cornering maneuver, in particular a cornering action. Under some circumstances this voltage cannot be provided even by the combination of the battery and the electric generator of the motor vehicle, both of which are already feeding power—for example, at largely maximum power output—into the vehicle electric system. This may be the case especially in the winter, when the electric seat heater and/or additional consumers or loads with a high electric connect load are turned on. If a cornering maneuver is initiated in such a situation without any counter-measures, the voltage in the vehicle electric system collapses significantly due to the additional load of the electric steering system, because the steering system has to provide a high mechanical torque during a cornering action, and the steering becomes stiff. This situation is very unpleasant for the driver, especially during a cornering maneuver that is to be executed very fast. The inventive method recognizes very reliably the imminence of a cornering maneuver. The voltage in the vehicle electric system is stabilized by the temporary increase in the injection quantity and the provision of the torque restriction by eliminating the ignition angle adjustment from just before the cornering maneuver to just after the cornering maneuver.

Figure 1:
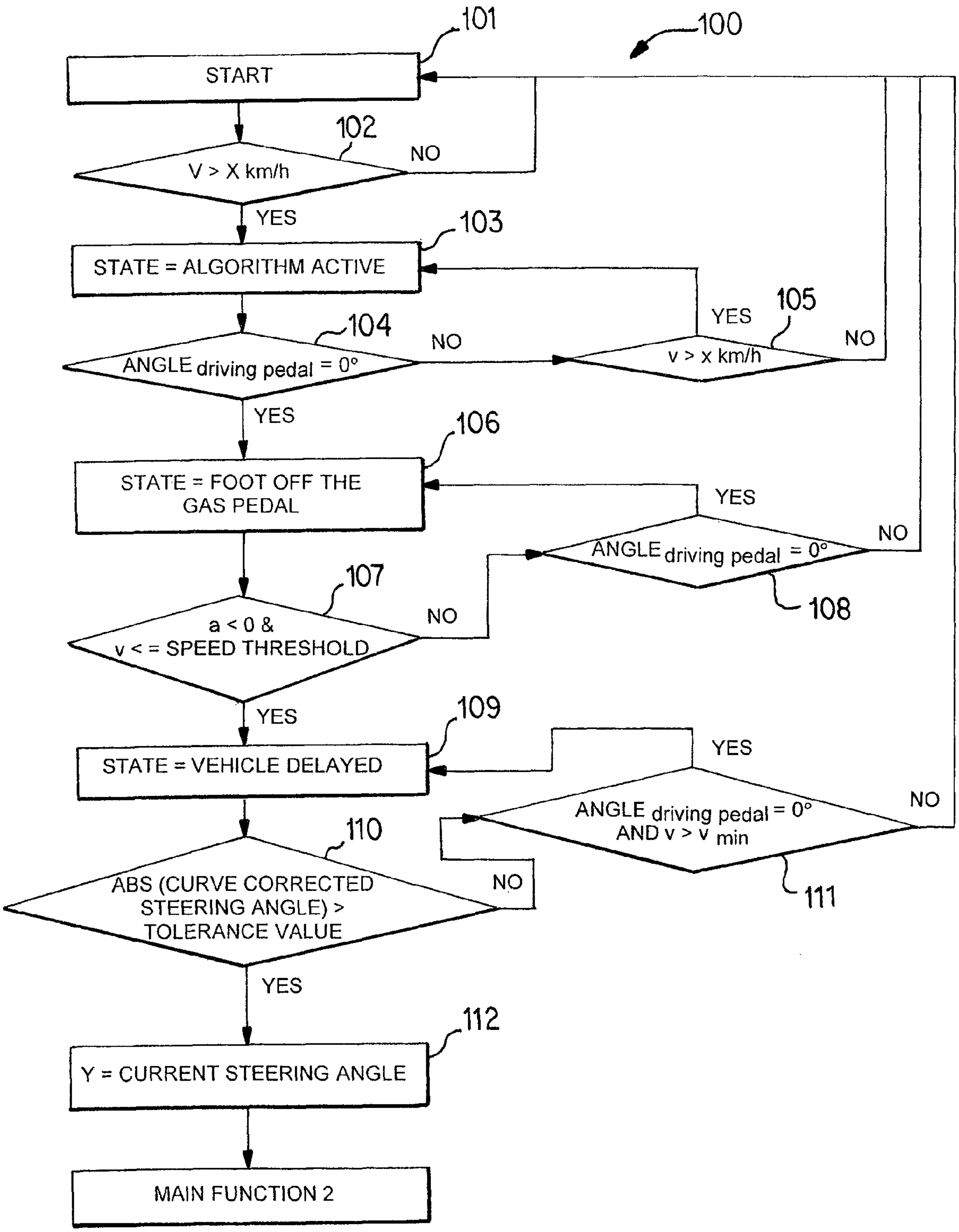
FIG. 1 is a flow chart depicting the main function 1 (the first part) of an embodiment of the inventive method.

FIG. 1 shows the first part 100 (main function 1) of an embodiment of the inventive method for detecting whether the motor vehicle will perform a cornering maneuver in a short period of time. After beginning in step 101, step 102 compares whether the vehicle is exceeding a predetermined speed x. If not, then the comparison is executed again. If yes, then the method for detecting an imminent cornering maneuver is active, as shown in state 103.

Step 104 compares whether the accelerator pedal (also referred to as a driving or gas pedal) is activated, that is, whether the angle of the pedal is 0 degree (rest position). If no, then step 105 checks whether the speed of the vehicle is greater than the predetermined speed x. If yes, then step 104 is executed again. If no, then the method begins all over again with step 101. If the comparison in step 104 is positive, the state "foot off the gas" is present, as indicated in state 106.

Step 107 compares whether the acceleration of the vehicle is negative (a<0) and whether the speed is less than or equal to a predetermined speed (v<=speed threshold). If no, then the position of the gas pedal is detected again in step 108. If the gas pedal is not in the rest state, the method begins after step 101. If the gas pedal is not deflected (activated), this state is regarded as the state 106 and the comparison 107 is executed again. If the result of the comparison 107 is "yes," then the state of the vehicle is "vehicle delayed" (state 109).

The term "curve-corrected steering angle," which is used below, is defined as follows. If the vehicle is traveling on a straight road, the steering angle (the position of the steering wheel) is 0 degree, that is, straight-ahead driving. If the vehicle is driving in a curve, then the steering angle is different from 0 degree. If it concerns, for example, a uniform left curve, then the steering angle for the time duration of travel through the uniform left curve is, for example, −10 degrees. In order to be able to distinguish this mode of deflecting the steering wheel (no conscious steering) from an actual steering action (conscious steering action) even in the event of driving through a curve, the method determines the size of the average steering angle for a past short period of time of, for example, 3 seconds, and determines the size of the current steering angle. Then, the difference between the average steering angle and the current steering angle is formed. This difference is the curve-corrected steering angle.

Step 110 compares whether the absolute value of the curve-corrected steering angle is greater than a tolerance value, that is, "abs (curve-corrected steering angle)>tolerance value." A driver will always turn the steering wheel back and forth while driving without any intention of steering with such motion.

If no, then step 111 checks whether the gas pedal is not deflected and whether the speed of the vehicle is greater than a predetermined minimum speed. If yes, then the vehicle is situated in state 109. If no, then the method begins all over again with state 101 "start." If the result of step 110 is "yes," then the current steering angle y in state 112 is noted and it is assumed that the first part of a "swerve" could have been caused by the driver. The main function 2, shown in FIG. 2, is described in detail below.

Figure 2:
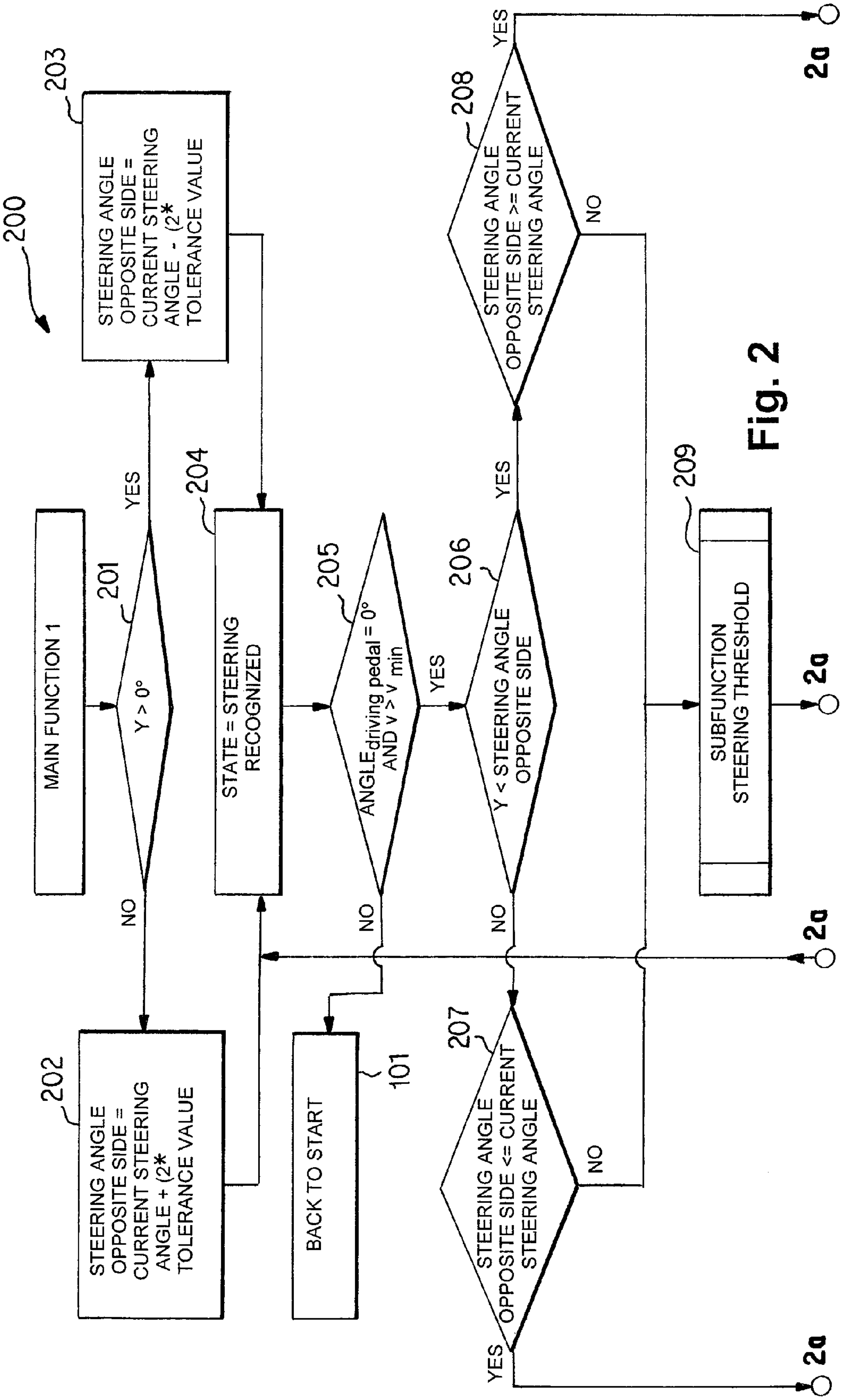
FIG. 2 is a flow chart depicting the main function 2 (the second part) of an embodiment of the inventive method.
Figure 2A:
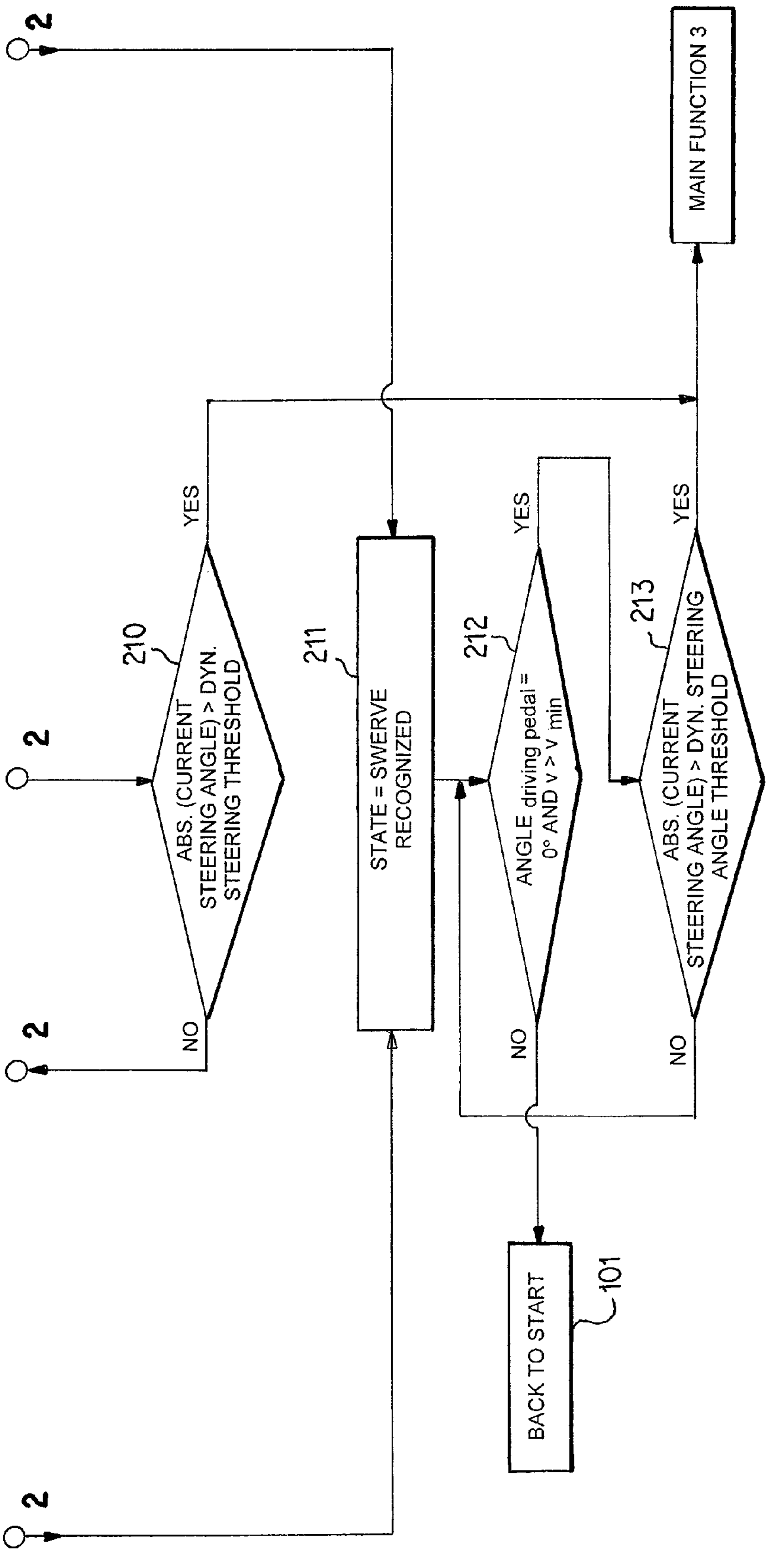

FIG. 2 shows the second part 200 (main function 2) of the method. The second part 200 determines in steps 201 to 211 whether the driver has or has not "swerved," an action that may be another indicator of an imminent cornering action. Many—but not all—drivers swerve before a cornering action.

What is meant by the term "swerve" shall be explained, first of all, for the case of a straight road. If the driver follows the straight course of the road, the steering wheel stays predominantly in its rest position. In a first mode of a swerving action, the steering wheel is moved first to the right well beyond the rest position of the steering wheel and then significantly to the left well beyond the rest position. At the same time the driver moves to the right edge of the driving lane in right traffic, and the front end of the vehicle already points somewhat more in the opposite direction than in the straight-ahead driving mode. In a second mode of a swerving action, the driver moves the steering wheel first to the left well beyond the rest position of the steering wheel and then significantly to the right well beyond the rest position.

If the driver swerves, when the vehicle is moving, for example, in a left-hand curve, then the driving lane moves, so-to-say, under the vehicle to the left—in contrast to a straight road. During a normal cornering action, the steering wheel is turned in conformity with the curvature of the curve as compared to the 0 position. That is, the steering angle for a left curve is less than 0 degree and for a right curve it is greater than 0 degree.

In order to be able to recognize a swerve even during a cornering action, step 201 checks whether the steering angle y is greater than 0 degree. If no, then the steering angle opposite side=steering angle+(2*tolerance angle) applies, that is, state 202. If yes, then the steering angle opposite side=steering angle−(2*tolerance angle) applies, that is, state 203. In both cases the "state=steering recognized" 204 applies.

Step 205 re-checks whether the pedal is not deflected and whether the speed is greater than the predetermined minimum speed. If no, then the method begins all over again with "start," that is, with state 101.

If yes, then step 206 checks whether the current steering angle y is less than the "steering angle opposite side" (cf. state 202 and 203). If no, then step 207 checks whether the steering angle opposite side is less than or equal to the current steering angle. If yes, then this is deemed to be the swerve, as stated in state 211 "swerve recognized."

If yes, then step 208 checks whether the "steering angle opposite side" is greater than or equal to the current steering angle. If yes, then this is deemed to be a swerve, as stated in state 211. If the result of the comparison in step 207 or 208 is "No," then the subfunction "steering threshold" 209 is executed in accordance with the method.

Figure 4:
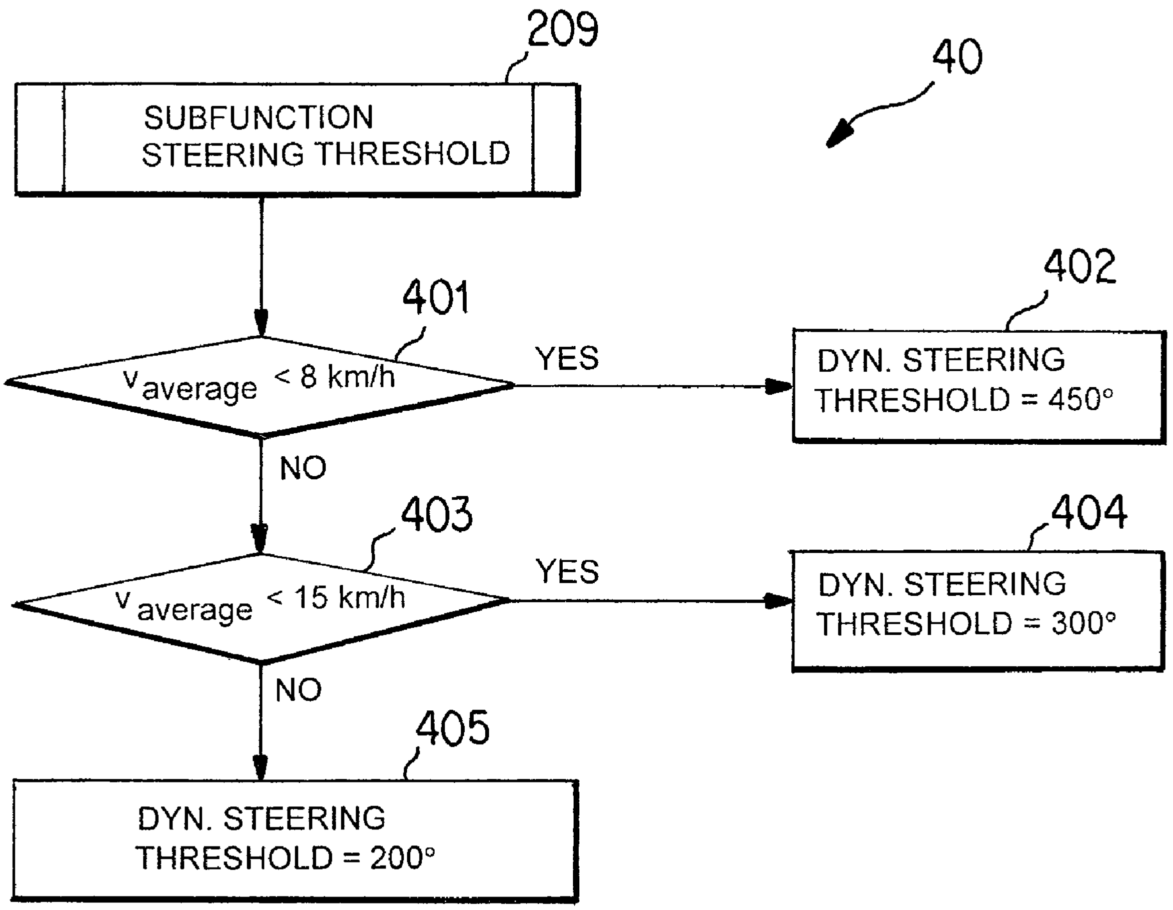
FIG. 4 is a flow chart depicting the subfunction "steering threshold" of an embodiment of the inventive method.

FIG. 4 shows the subfunction "steering threshold" 400 of the method, in which a speed-dependent and, thus, dynamic steering threshold is defined for the additional process steps. Step 401 checks whether the speed of the vehicle that is found over a specific period of time is less than 8 km/h. The period of time can range, for example, from 3 to 10 seconds. If yes, then the value of the dynamic steering threshold is set at 450 degrees (state 402). In the straight-ahead driving mode of the vehicle, that is, for a steering wheel, which is not deflected from this position, the angle amounts to 0 degree or 360 degrees. If no, then step 403 checks whether the average speed of the vehicle is less than 15 km/h, that is, in combination with step 401, whether the average speed lies between 8 km/h and 15 km/h. If yes, then the value of the dynamic steering threshold is set at 300 degrees (state 404). If no, that is, the speed is greater than 15 km/h, then the value of the dynamic steering threshold is set at 200 degrees.

Step 210 checks whether the absolute value of the current steering angle is greater than the dynamic steering threshold for the current vehicle speed. If no, then the method begins all over again with state 204, that is, "steering recognized." If yes, then the method continues with the main function 3 in FIG. 3.

If a swerve is considered to be recognized (step 211), then step 212 re-checks whether the pedal is not activated (angle=0 degree) and whether the speed is greater than the predetermined minimum speed. If no, then the inventive method begins all over again with "start," that is, after the state 101. If yes, then step 213 checks whether the absolute value of the current steering angle is greater than the dynamic steering angle threshold. If no, then the comparison in step 212 is repeated. If yes, then the state "counter-steering recognized" 301 is present and the method continues with the main function 3, shown in FIG. 3.

Figure 3:
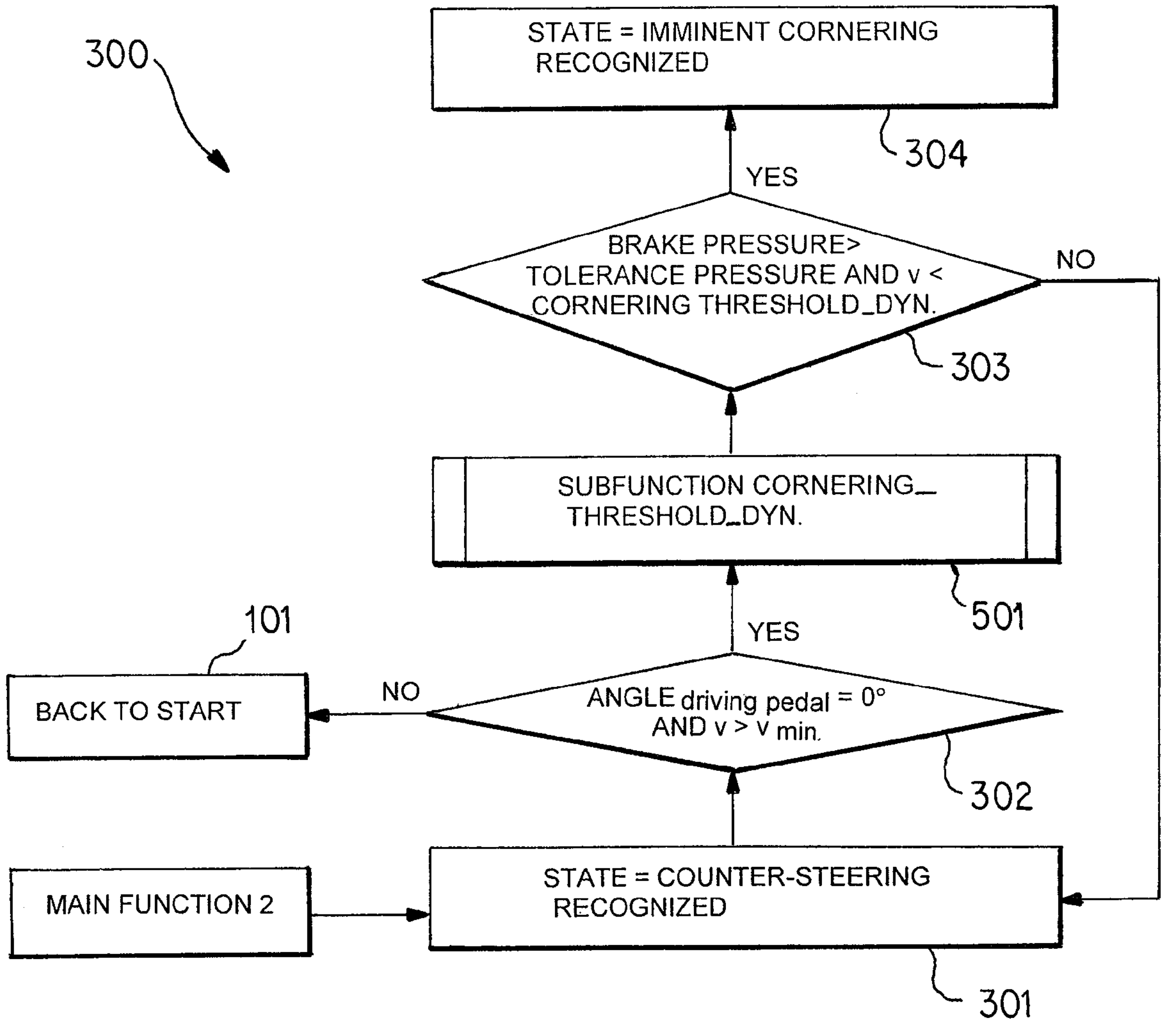
FIG. 3 is a flow chart depicting the main function 3 (the third part) of an embodiment of the inventive method.

In the third part of the method, which is shown in FIG. 3, step 302 re-checks at this point whether the gas pedal is not activated and whether the speed of the vehicle is greater than the predetermined minimum speed. If no, then the method begins all over again with "start," that is, after step 101. If yes, then the subfunction "dynamic cornering threshold" 501, shown in FIG. 5, is executed.

Figure 5:
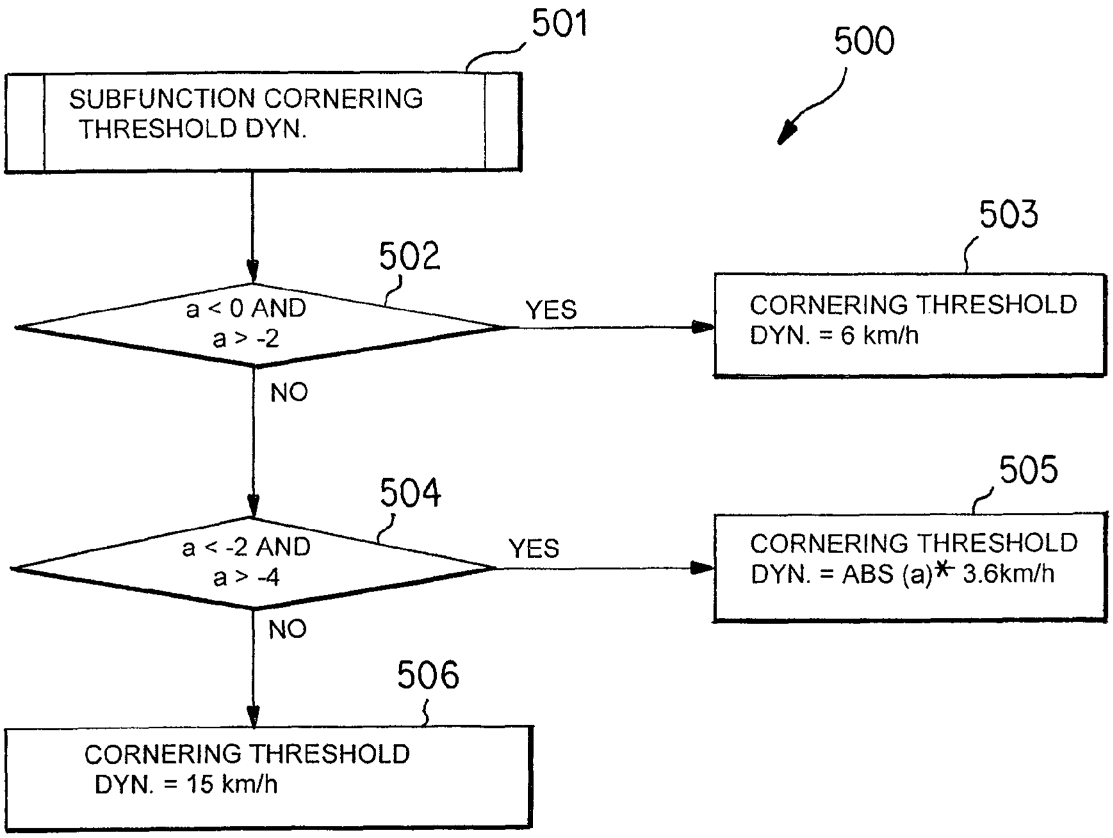
FIG. 5 is a flow chart depicting the subfunction "dynamic cornering threshold" of an embodiment of the inventive method.

In the subfunction "dynamic cornering threshold" 501, shown in FIG. 5, the step 502 checks whether the negative acceleration of the vehicle that was found during the last seconds ranges from 0 $m/s^2$ to $-2$ $m/s^2$. If yes, then the value of the dynamic cornering threshold in step 503 is set at 6 km/h. If no, then step 504 checks whether the negative acceleration ranges from $-2$ $m/s^2$ to $-4$ $m/s^2$. If yes, then the value of the dynamic cornering threshold in step 505 is set at the value: absolute value of the acceleration times the factor 3.6. The result is a speed value. If no, then the value of the dynamic cornering threshold in step 506 is set at 15 km/h.

After step 501, step 303, shown in FIG. 3, checks whether the brake pressure is higher than a predetermined tolerance brake pressure. In addition, it is checked whether the current speed of the vehicle v is less than the dynamic cornering threshold, determined in the subfunction "dynamic cornering threshold." If no, then the method begins all over again with step 301 in FIG. 3.

If yes, then the "state of imminent cornering recognized" applies in step 304. In step 304, the influence on the engine control unit of the internal combustion engine of the motor vehicle causes an increase in the injection quantity and the ignition timing changes in such a manner that the increase in torque that is accompanied by an increase in the injection quantity is compensated. That is, the result is a torque restriction, which can be induced temporarily by resetting the ignition timing to the original timing. This occurs with the recognition of the actual cornering maneuver, a feature that is indicated, in particular, by a significant increase in the electric load or rather a developing voltage collapse in the vehicle electric system owing to the activated electric steering system. After the cornering action has been completed (or presumably has been completed), the internal combustion engine is operated in an operating mode without torque restriction. The termination of the cornering action can be monitored and recognized, for example, by the device for detecting the driving situation. One criterion can be, for example, that the driver is already driving again straight ahead for a period of time or that the vehicle has reached a predetermined speed. Similarly, it can be provided that the cornering action is deemed to be completed after a predetermined time following step 304.

It is clear that the invention can also be carried out in an alternative embodiment, where the torque restriction is already initiated at an earlier time in the course of the method. Then, however, the risk of a "false alarm" may increase. That is, the torque restriction and the concomitant increase in the injection quantity that is not as favorable to consumption will then occur without any real subsequent need.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for reducing energy consumption of a motor vehicle having an internal combustion engine and a vehicle electric system to which at least a first electric consumer is operatively coupled, the method comprising the acts of:

providing a first operating mode of the internal combustion engine having a first injection quantity and a first ignition timing;

providing a second operating mode of the internal combustion engine having a second injection quantity higher than the first injection quantity and a second ignition timing which, at the second ignition quantity, provides a lower performance of the internal combustion engine than the first ignition timing;

providing a third operating mode of the internal combustion engine having the second injection quantity and predominantly the first ignition timing in order to provide a higher performance of the internal combustion engine in the third operating mode than in the second operating mode;

determining an imminent specific driving situation, based upon at least one of a previous behavior of the driver in controlling the motor vehicle and a behavior of the vehicle in advance, via a driving situation detection device of the vehicle; and upon determining the imminent specific driving situation, initiating a switch from the first operating mode to the second operating mode of the internal combustion engine.

2. The method according to claim 1, further comprising the act of, upon recognizing a specific driving situation, initiating a switch from the second operating mode to the third operating mode of the internal combustion engine by the driving situation detection device.

3. The method according to claim 2, wherein the act of determining a specific driving situation is carried out by recognizing that an electric voltage of the vehicle electric system is on a verge of collapse.

4. The method according to claim 1, wherein, in the third operating mode of the internal combustion engine, a higher electric load on the vehicle electric system is largely passed on without delay to an electric generator of the vehicle.

5. The method according to claim 2, wherein, in the third operating mode of the internal combustion engine, a higher electric load on the vehicle electric system is largely passed on without delay to an electric generator of the vehicle.

6. The method according to claim 1, wherein on determining the imminent specific driving situation, the driving situation detection device initiates, instead of a switch in the operating modes of the internal combustion engine from the first to the second operating mode, a switch in the operating modes of the internal combustion engine directly from the first to the third operating mode.

7. The method according to claim 1, wherein a first electric consumer is an electrically operated steering system of the motor vehicle, and the imminent specific driving situation is a cornering action.

8. The method according to claim 1, wherein a position of a driving pedal is detected by the driving situation detection device, and the operating mode of the internal combustion engine is switched from the first operating mode to the second operating mode, when the driving pedal is located largely in its rest position, and at least one additional driving situation occurs.

9. The method according to claim 3, wherein a position of a driving pedal is detected by the driving situation detection device, and the operating mode of the internal combustion engine is switched from the first operating mode to the second operating mode, when the driving pedal is located largely in its rest position, and at least one additional driving situation occurs.

10. The method according to claim 1, wherein an acceleration and a speed of the vehicle are detected by the driving situation detection device, and the operating mode of the internal combustion engine is switched from the first operating mode to the second operating mode, when the acceleration of the vehicle is negative, the speed falls below a predetermined threshold value, and at least one additional driving situation occurs.

11. The method according to claim 1, wherein a steering angle of the electric steering system of the vehicle is detected by the driving situation device and the operating mode of the internal combustion engine is switched from the first operating mode to the second operating mode, when an absolute value of the steering angle is greater than a predetermined threshold value, and at least one additional driving situation occurs.

12. The method according to claim 1, wherein a steering angle of the electric steering system of the vehicle is detected by the driving situation device, and the operating mode of the internal combustion engine is switched from the first operating mode to the second operating mode, when an absolute value of the steering angle is greater than a predetermined speed-dependent steering angle threshold, and at least one additional driving situation occurs.

13. The method according to claim 1, wherein the driving situation device checks whether the vehicle is making a swerving maneuver.

14. The method according to claim 13, wherein the driving situation device checks whether a brake pressure is higher than a predetermined brake pressure and, in addition, checks whether a speed is less than at least one of a predetermined acceleration-dependent speed value and a dynamic cornering threshold.

15. A vehicle electric system of a motor vehicle, comprising a program-controlled device having a computer readable medium storing program code segments that:

provide a first operating mode of the internal combustion engine having a first injection quantity and a first ignition timing;

provide a second operating mode of the internal combustion engine having a second injection quantity higher than the first injection quantity and a second ignition timing which, at the second ignition quantity, provides a lower performance of the internal combustion engine as the first ignition timing;

provide a third operating mode of the internal combustion engine having the second injection quantity and predominantly the first ignition timing in order to provide a higher performance of the internal combustion engine in the third operating mode than in the second operating mode;

recognize an imminent specific driving situation, based upon at least one of a previous behavior of the driver in controlling the motor vehicle and a behavior of the vehicle in advance, via a driving situation detection device of the vehicle; and upon determining the imminent specific driving situation, initiate a switch from the first operating mode to the second operating mode of the internal combustion engine.

16. A program-controlled device for detecting a driving situation of a motor vehicle, the program-controlled device comprising a computer-readable medium storing program code segments that:

provides a first operating mode of the internal combustion engine having a first injection quantity and a first ignition timing;

provides a second operating mode of the internal combustion engine having a second injection quantity higher than the first injection quantity and a second ignition timing which, at the second ignition quantity, provides a lower performance of the internal combustion engine as the first ignition timing;

provides a third operating mode of the internal combustion engine having the second injection quantity and predominantly the first ignition timing in order to provide a higher performance of the internal combustion engine in the third operating mode than in the second operating mode;

recognizes an imminent specific driving situation, based upon at least one of a previous behavior of the driver in controlling the motor vehicle and a behavior of the vehicle in advance, via a driving situation detection device of the vehicle; and upon determining the imminent specific driving situation, initiates a switch from the first operating mode to the second operating mode of the internal combustion engine.

* * * * *